United States Patent
Wen et al.

(10) Patent No.: US 12,425,382 B2
(45) Date of Patent: Sep. 23, 2025

(54) CROSS-PLATFORM CHATBOT USER AUTHENTICATION FOR CHAT HISTORY RECOVERY

(71) Applicant: INTERNATIONAL BUSINESS MACHINES CORPORATION, Armonk, NY (US)

(72) Inventors: Bo Wen, New York, NY (US); Chen Wang, Chappaqua, NY (US); Jeremy R. Fox, Georgetown, TX (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 18/451,230

(22) Filed: Aug. 17, 2023

(65) Prior Publication Data
US 2025/0063029 A1 Feb. 20, 2025

(51) Int. Cl.
*H04L 9/40* (2022.01)
*H04L 51/02* (2022.01)

(52) U.S. Cl.
CPC .............. *H04L 63/08* (2013.01); *H04L 51/02* (2013.01)

(58) Field of Classification Search
CPC ....... H04L 63/08; H04L 51/02; H04L 51/216; G06F 2221/2103; G06F 21/31
See application file for complete search history.

(56) References Cited

U.S. PATENT DOCUMENTS

| 10,217,453 B2 | 2/2019 | Stevans |
| 11,605,384 B1 | 3/2023 | Dalton |
| (Continued) | | |

FOREIGN PATENT DOCUMENTS

| CN | 111445271 A | 7/2020 |
| CN | 109614777 B | 9/2020 |
| (Continued) | | |

OTHER PUBLICATIONS

Boda et al., "User Tracking on the Web via Cross-Browser Fingerprinting", Springer-Verlag Berlin Heidelberg 2012, pp. 31-46.
(Continued)

*Primary Examiner* — Nicholas R Taylor
*Assistant Examiner* — Tania M Pena-Santana
(74) *Attorney, Agent, or Firm* — Teddi Maranzano

(57) ABSTRACT

An embodiment for improved authentication of chatbot users for chat history recovery. The embodiment may record a first chat conversation between a first chat service operator and a first user, wherein the first chat conversation includes a first-step authentication and a chat history. The embodiment may detect a request to resume the first chat conversation. The embodiment may, in response to detecting the request to resume the first chat conversation, initiate a recovery process by sending a random-generated token to the first-step authentication. The embodiment may receive verification of the random-generated token. The embodiment may generate, by a large language model, one or more authentication questions based on content of the chat history. The embodiment may authenticate the first user based on one or more correct answers to the one or more authentication questions. The embodiment may resume the first chat conversation including the chat history.

17 Claims, 3 Drawing Sheets

(56) References Cited

U.S. PATENT DOCUMENTS

| | | | |
|---|---|---|---|
| 2020/0034551 A1* | 1/2020 | Cantrell | H04L 9/3247 |
| 2020/0099633 A1 | 3/2020 | D'Agostino et al. | |
| 2020/0366628 A1* | 11/2020 | Olivera | H04L 63/08 |
| 2021/0157618 A1* | 5/2021 | Moon | H04L 51/02 |
| 2021/0337000 A1* | 10/2021 | Lord | G06Q 10/103 |
| 2022/0384061 A1* | 12/2022 | Nandwana | H04W 4/14 |
| 2024/0202539 A1* | 6/2024 | Poirier | G06F 40/40 |
| 2025/0103625 A1* | 3/2025 | Addanki | G06F 16/3326 |

FOREIGN PATENT DOCUMENTS

| | | |
|---|---|---|
| CN | 110134765 B | 6/2021 |
| CN | 113421570 A | 9/2021 |
| CN | 115602161 A | 1/2023 |
| WO | 2016107415 A1 | 7/2016 |

OTHER PUBLICATIONS

Jovanovic, et al., "Chatbots as Conversational Healthcare Services", IEEE, Nov. 11, 2020, 8 Pages.

International Searching Authority, "Notification of Transmittal of the International Search Report and the Written Opinion of the International Searching Authority, or Declaration," Patent Cooperation Treaty, Sep. 17, 2024, 13 pages, International Application No. PCT/IB2024/056398.

Voege et al., "Smart Chatbot for User Authentication", Electronics, vol. 11, No. 23, Dec. 2022, 21 pages.

Yang et al., "A Systematic Literature Review of Information Security in Chatbots", Applied Sciences, vol. 13, No. 11, Jun. 2023, 18 pages.

\* cited by examiner

CROSS-PLATFORM CHATBOT USER AUTHENTICATION FOR CHAT HISTORY RECOVERY

BACKGROUND

The present application relates generally to computer processing, and more particularly, to authentication of chatbot users for chat history recovery.

Many businesses utilize chatbots to help automate routine tasks and to provide their customers with automated answers to relevant lines of questioning. For many industries employing chatbots, steps are taken to ensure the protection of private or sensitive information associated with each customer. For example, in the healthcare industry, conversations with employed chatbots often involve patient information which must be secured and protected. Accordingly, businesses strive to provide the most effective and reliable chatbots for their customers while preserving the security of protected customer information.

SUMMARY

According to one embodiment, a method, computer system, and computer program product for improved authentication of chatbot users for chat history recovery is provided. The embodiment may include recording a first chat conversation between a first chat service operator and a first user, wherein the first chat conversation includes a first-step authentication and a chat history. The embodiment may also include detecting a request to resume the first chat conversation. The embodiment may further include, in response to detecting the request to resume the first chat conversation, initiating a recovery process by sending a random-generated token to the first-step authentication. The embodiment may also include receiving verification of the random-generated token. The embodiment may further include generating, by a large language model, one or more authentication questions based on content of the chat history. The embodiment may also include authenticating the first user based on one or more correct answers to the one or more authentication questions. The embodiment may further include resuming the first chat conversation with the authenticated first user, the resumed first chat conversation including the chat history.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
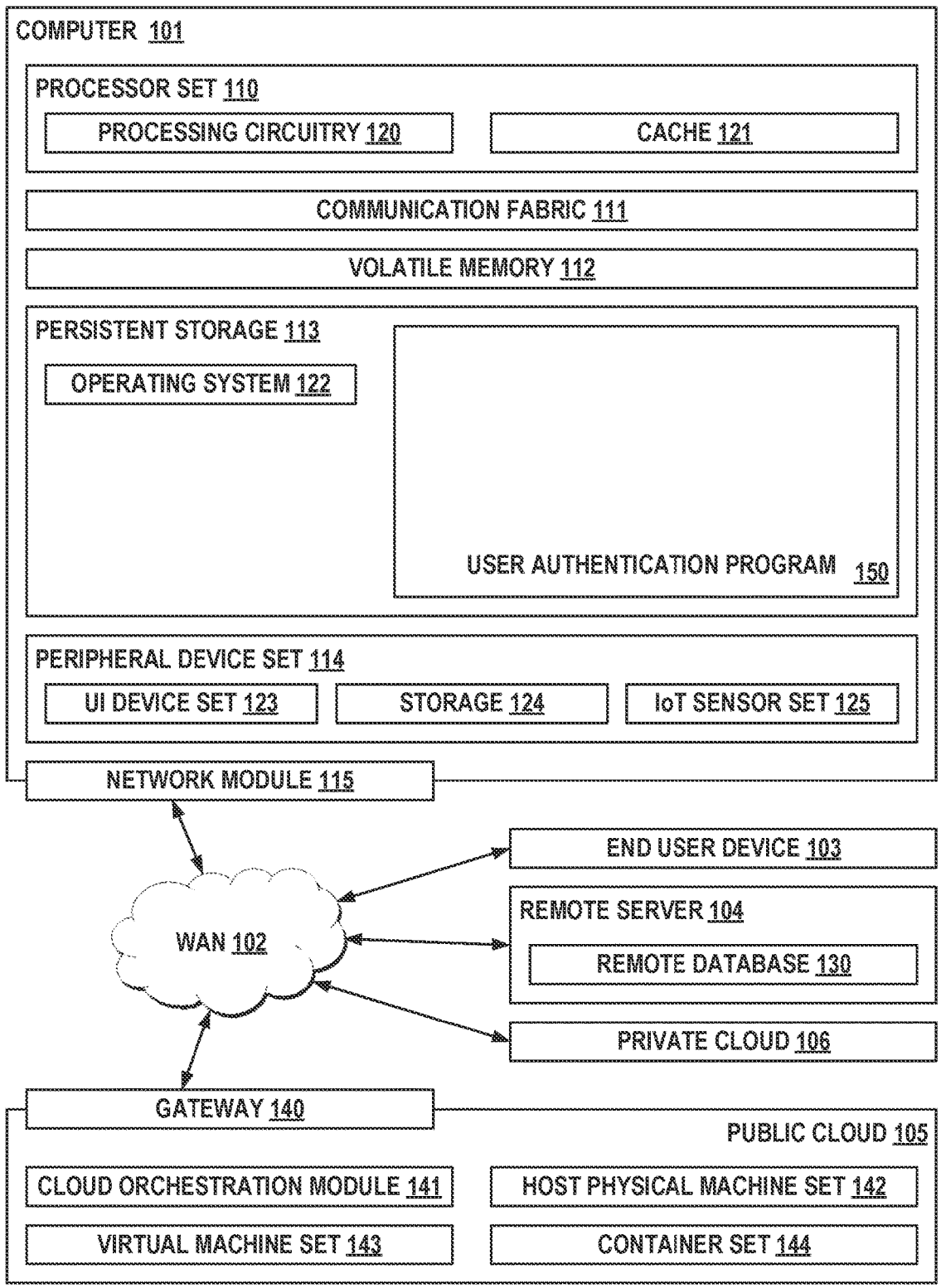
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

According to one aspect, the present disclosure relates to a computer-based method of authenticating chatbot users and recovering chat history associated with the chatbot users, the method including: recording a first chat conversation between a first chat service operator and a first user, wherein the first chat conversation includes a first-step authentication and a chat history, detecting a request to resume the first chat conversation, in response to detecting the request to resume the first chat conversation, initiating a recovery process by sending a random-generated token to the first-step authentication, receiving verification of the random-generated token, generating, by a large language model, one or more authentication questions based on content of the chat history, authenticating the first user based on one or more correct answers to the one or more authentication questions, and resuming the first chat conversation with the authenticated first user, the resumed first chat conversation including the chat history. This provides multiple layers of user authentication and the ability to securely retrieve a historical conversation for resuming a chat between the user and a chatbot.

In embodiments, the first-step authentication includes one of a phone number or an email. This provides for a first-step authentication that is secure and associated specifically with the user to bolster security and may be subsequently leveraged when generating a unique ID to assign to a user chat history for future retrieval.

In embodiments, the first chat service operator includes one or more web-based chatbots, one or more phone-based chatbots, or a combination thereof. This allows flexibility for the user who may attempt to resume a conversation using any one of the above-mentioned platforms or types of chatbots.

In other embodiments, described methods may further include storing the chat history, using a chatbot backend server, within a storage component. Leveraging the chatbot backend server to store the chat history within a storage component allows the chat history to be fetched later upon verifying and authenticating a user.

In yet another embodiment, the detected request to resume the first chat conversation is detected on a different platform from a first platform on which the chat service operator hosted the first conversation. This provides for a system capable of resuming a chat between a user and a chatbot regardless of the platform that the chat began on, or the platform from which the request to resume is being made, providing convenience and flexibility to the user regardless of the chatting environment.

In another embodiment, described methods may further include sending the one or more generated authentication questions to a second language model for answering, and, in response to detecting that the second language model correctly answered the one or more generated authentication questions, replacing the one or more generated authentication questions with a second set of generated authentication questions. This provides the technical advantage of essentially testing the first set of generated authentication questions to see if they are too generic to provide sufficient security during user authentication. If an independent second language model correctly answers the one or more generated authentication questions, they are deemed too generic, and a replacement set of questions including the second set of generated authentication questions may be generated to provide increased security during the authentication of the user requesting to resume a conversation.

In yet another embodiment, described methods may further include leveraging the chatbot backend server of the first chat service operator to generate a unique identifier associated with the first-step authentication corresponding to the first user, and assigning the generated unique identifier to associated with the first-step authentication corresponding to the first user to the stored chat history. This provides the benefit of ensuring each chat history is associated with a unique identifier allowing for storage of multiple chats associated with different users. The unique identifiers may further be leveraged to fetch a chat history for resuming a conversation between a user and a chatbot.

In another aspect, the present disclosure relates to a computer system, the computer system including one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method including: recording a first chat conversation between a first chat service operator and a first user, wherein the first chat conversation includes a first-step authentication and a chat history, detecting a request to resume the first chat conversation, in response to detecting the request to resume the first chat conversation, initiating a recovery process by sending a random-generated token to the first-step authentication, receiving verification of the random-generated token, generating, by a large language model, one or more authentication questions based on content of the chat history, authenticating the first user based on one or more correct answers to the one or more authentication questions, and resuming the first chat conversation with the authenticated first user, the resumed first chat conversation including the chat history. This provides for a computer system capable of ensuring multiple layers of user authentication and the ability to securely retrieve a historical conversation for resuming a chat between the user and a chatbot.

In yet another aspect, the present disclosure relates to A computer program product, the computer program product including one or more computer-readable tangible storage medium and program instructions stored on at least one of the one or more computer-readable tangible storage medium, the program instructions executable by a processor capable of performing a method, the method including: recording a first chat conversation between a first chat service operator and a first user, wherein the first chat conversation includes a first-step authentication and a chat history, detecting a request to resume the first chat conversation, in response to detecting the request to resume the first chat conversation, initiating a recovery process by sending a random-generated token to the first-step authentication, receiving verification of the random-generated token, generating, by a large language model, one or more authentication questions based on content of the chat history, authenticating the first user based on one or more correct answers to the one or more authentication questions, and resuming the first chat conversation with the authenticated first user, the resumed first chat conversation including the chat history. This provides for a computer system capable of ensuring multiple layers of user authentication and the ability to securely retrieve a historical conversation for resuming a chat between the user and a chatbot.

Embodiments of the present application relate generally to computer processing, and more particularly, to improved authentication of chatbot users for chat history recovery. The following described exemplary embodiments provide a system, method, and program product to, among other things, store a first chat conversation between a first chat service operator and a first user, wherein the stored first chat conversation includes a first-step authentication and a chat history, detect a request to resume the first chat conversation, in response to detecting the request to resume the first chat conversation, initiate a recovery process by sending a random-generated token to the first-step authentication, receive verification of the random-generated token, generate, by a large language model, one or more authentication questions based on content of the chat history, authenticate the first user based on one or more correct answers to the one or more authentication questions, and resume the first chat conversation with the authenticated first user, the resumed first chat conversation including the chat history.

As previously described, many businesses utilize chatbots to help automate routine tasks and to provide their customers with automated answers to relevant lines of questioning. For many industries employing chatbots, steps are taken to ensure the protection of private or sensitive information associated with each customer. For example, in the healthcare industry, conversations with employed chatbots often involve patient information which must be secured and protected. Accordingly, businesses strive to provide the most effective and reliable chatbots for their customers while preserving the security of valuable or protected customer information.

However, there are many challenges faced by businesses in trying to provide effective and reliable chatbots while preserving the security of valuable or protected customer information. For example, many customers experience instances of unintentionally disconnecting from a given chatbot conversation due to technical issues. This burdens the customer by requiring the customer to inefficiently repeat the process of inputting the same information that was previously processed by the chatbot before the conversation was interrupted. While some chatbots are merely for marketing purposes, and therefore do not store conversation history on the server side, other chatbots are specifically designed such that they are unable to resume interrupted conversations to preserve security and privacy concerns related to customer information. This prevents the accidental sharing of protect customer information that may occur if a given platform, browser, or device IP address (or any combination of these three) is used by multiple customers, such as, for example, in a library, hospital, or other accessible non-private setting. Thus, current chatbots either impose heavy burdens on the customer in the event of a disconnect by forcing the customer to begin a conversation from the beginning, or alternatively, store customer chat history at great risk to the security of sensitive customer information due to a lack of proper user authentication by chatbots operating on platforms (or a singular shared platform) accessible by multiple users.

Accordingly, a method, computer system, and computer program product for improved authentication of chatbot users for chat history recovery would be advantageous. The method, system, and computer program product may store a first chat conversation between a first chat service operator and a first user, wherein the stored first chat conversation includes a first-step authentication and a chat history. The method, system, computer program product may detect a request to resume the first chat conversation. The method, system, computer program product may then, in response to detecting the request to resume the first chat conversation, initiate a recovery process by sending a random-generated token to the first-step authentication. The method, system, computer program product may receive verification of the random-generated token. Next, the method, system, computer program product may generate, by a large language model, one or more authentication questions based on content of the chat history. Then, the method, system, computer program product may authenticate the first user based on one or more correct answers to the one or more authentication questions. Thereafter, the method, system, computer program product may resume the first chat conversation with the authenticated first user, the resumed first chat conversation including the chat history. In turn, the method, system, computer program product has provided for improved authentication of chatbot users for chat history recovery by providing for a method that may track users across multiple platforms by employing a two-step authentication process before allowing a user to resume a disconnected first conversation. Described embodiments utilize a first authentication mechanism associated with the user that is both secure, and functions as a method by which the user may receive a random-generated verification token. Described embodiments, upon receiving verification of the random-generated verification token, may then leverage large language models to generate a second authentication mechanism which includes authentication questions based upon content within stored chat history associated with the user. Upon authenticating the user based on correct answers to the generated authentication questions, described embodiments may then resume the first chat conversation with the previous chat history included and displayed to the user. Described embodiments thus provide for improved reliability and effectiveness of chatbots by employing multiple authentication mechanisms which ensure that valuable, private, or otherwise sensitive customer information is securely maintained even when resuming conversations including stored chat history across one or more platforms that may be used by multiple customers.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as user authentication program/code 150. In addition to user authentication code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and user authentication code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in user authentication code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in user authentication program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the user authentication program 150 may be a program capable of storing a first chat conversation between a first chat service operator and a first user, wherein the stored first chat conversation includes a first-step authentication and a chat history. User authentication program 150 may then detect a request to resume the first chat conversation. Next, user authentication program 150 may, in response to detecting the request to resume the first chat conversation, initiate a recovery process by sending a random-generated token to the first-step authentication. User authentication program 150 may then receive verification of the random-generated token. Next, user authentication program 150 may generate, by a large language model, one or more authentication questions based on content of the chat history. User authentication program 150 may then authenticate the first user based on one or more correct answers to the one or more authentication questions. Thereafter, user authentication program 150 may resume the first chat conversation with the authenticated first user, the resumed first chat conversation including the chat history. In turn, user authentication program 150 has provided for improved authentication of chatbot users for chat history recovery by providing for a method that may track users across multiple platforms by employing a two-step authentication process before allowing a user to resume a disconnected first conversation. Described embodiments utilize a first authentication mechanism associated with the user that is both secure, and functions as a method by which the user may receive a random-generated verification token. Described embodiments, upon receiving verification of the random-generated verification token, may then leverage large language models to generate a second authentication mechanism which includes authentication questions based upon content within stored chat history associated with the user. Upon authenticating the user based on correct answers to the generated authentication questions, described embodiments may then resume the first chat conversation with the previous chat history included and displayed to the user. Described embodiments thus provide for improved reliability and effectiveness of chatbots by employing multiple authentication mechanisms which ensure that valuable, private, or otherwise sensitive customer information is securely maintained even when resuming conversations including stored chat history across one or more platforms that may be used by multiple customers.

Figure 2:
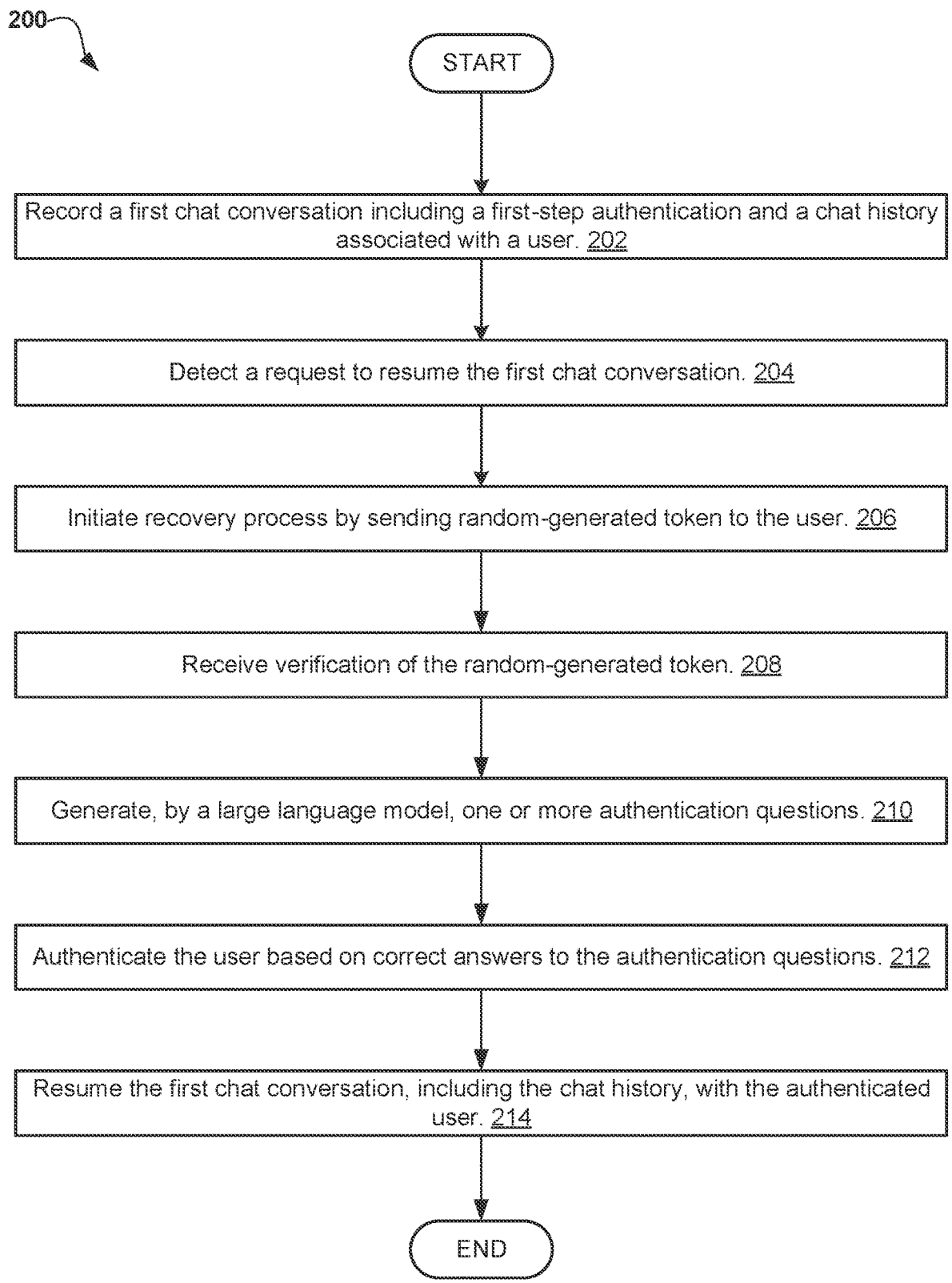
FIG. 2 illustrates an operational flowchart for an exemplary process of authenticating chatbot users for chat history recovery according to at least one embodiment.
Figure 3:
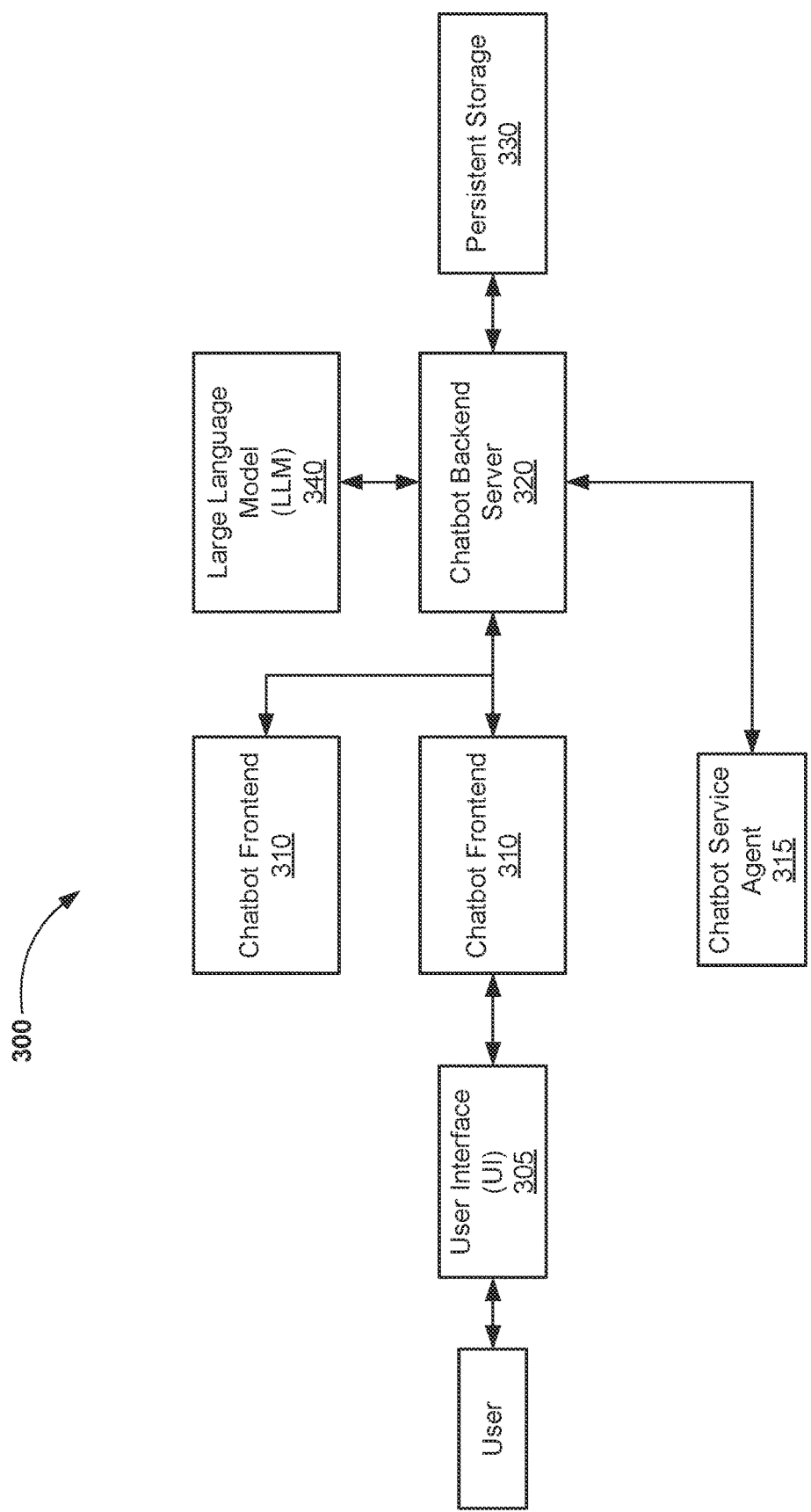
FIG. 3 depicts illustrative system architecture usable for performing an exemplary process of authenticating chatbot users for chat history recovery according to at least one embodiment.

Referring now to FIG. 2, an operational flowchart for an illustrative process 200 of exemplary process of authenticating chatbot users for chat history recovery according to at least one embodiment is provided. FIG. 3 will be discussed with reference to FIG. 3.

Specifically, FIG. 3 depicts illustrative system architecture 300 usable for performing an exemplary process of authenticating chatbot users for chat history recovery according to at least one embodiment. The exemplary system architecture 300 depicted in FIG. 3 includes a user interface 305 configured to receive communications from one or more chatbot frontends 310. Each chatbot frontend 310, as well as one or more chat service agents 315, are associated with at least one chatbot backend server 320. Chatbot backend server 320 is configured to utilize and leverage an accessible persistent storage 330 for chat history storage and indexing based on user contact IDs (first-step authentications), and a large language model 340 for generating authentication questions based on stored chat history data. Exemplary system architecture 300 will be referenced and described in greater detail throughout the description of illustrative process 200 below.

Returning to FIG. 2, at step 202 of illustrative process 200, user authentication program 150 may record a first chat conversation between a first chat service operator and a first user, wherein the first chat conversation includes a first-step authentication and a chat history. In the context of this disclosure, the first-step authentication (sometimes referred to as 'user contact information') may include any user-provided personal contact information that may be used to identify the user, such as, for example, the user's phone number, email address, or other unique identifying information. In embodiments, the chat service operator may include one or more web-based, one or more phone-based chatbots, or a combination of any suitable known chatbots. In embodiments, user authentication program 150 may be configured to leverage a chatbot frontend (such as chatbot frontend 310 in FIG. 3) to prompt a user to input information that may be used as the first-step authentication into any suitable user interface. (See for example, user interface 305 in FIG. 3) In embodiments, user authentication program 150 may leverage chatbot frontend 310 to send the gathered first-step authentication to the chatbot backend server 320 to initiate a chat session and synchronize all chatting messages and the gathered first-step authentication (user contact information). User authentication program 150 may then leverage the chatbot backend server to create a unique chat history ID and associate it with the user-submitted first-step authentication. In embodiments, user authentication program 150 may then leverage the chatbot frontend 310 and chatbot backend server 320 to store the chatting history in a persistent storage 330, indexed by unique chat history IDs. In embodiments, persistent storage 330 may be replaced with any suitable storage mechanism, such as, for example, a database of stored chat histories indexed by unique chat history IDs based on user contact information (first-step authentications). Thus, user authentication program 150 may continuously store the first chat conversation including the first-step authentication associated with the user, and the latest chat history associated with the user.

For example, at step 202, user authentication program 150 may record a first chat conversation between an exemplary user 'U1' and exemplary chatbot 'C1'. To accomplish this, user authentication program 150 may leverage a chatbot frontend of exemplary chatbot 'C1' to prompt exemplary user 'U1' to input, into a user interface, a first-step authentication such as a user phone number or email. Once the user has input, for example, a phone number, the chatbot frontend may forward the phone number as first-step authentication to a chatbot backend server of exemplary chatbot 'C1' and initiate a chat session, synchronizing all chatting messages and users' contacts. The chatbot backend server may then create a unique chat history ID 'CH1' and associate it with the user's specific first-step authentication (contact information), and subsequently continuously store or back up the chatting history in persistent storage 'PS1'. Accordingly, user authentication program 150 has stored a first chat conversation between exemplary user 'U1' and exemplary chatbot 'C1', where the chat history is stored within persistent storage along with a unique identifier (sometimes referred to as a unique ID) associated with the first step authentication (phone number) of exemplary user 'U1'.

Next, at 204, user authentication program 150 may detect a request to resume the first chat conversation. In embodiments, the detected request to resume the first chat conversation may be received by the same platform as the initial first conversation from step 202, or a different platform entirely. In other words, the detected request to resume the first chat conversation may be detected on a different platform from the first platform on which the chat service operator hosted the first conversation. This is because user authentication program 150 may functionally verify and authenticate users across different platforms.

At step 206, user authentication program 150 may, in response to detecting the request to resume the first chat conversation, initiate a recovery process by sending a random-generated token to the first-step authentication. At this step, user authentication program 150 may, for example, leverage exemplary chatbot frontend 310 to randomly generate a token to send to the first-step authentication associated with the user. In embodiments, user authentication program 150 may be configured to send a random-generated token including any suitable randomly generated series of numbers, letters, symbols, or any combination thereof. The random-generated token may be sent via the first-step authentication (user contact information) which may be accessed by multiple devices. Returning to the example described above, at this step, user authentication program 150 may, in response to detecting a request to resume the first chat conversation sent by exemplary user 'U1', generate and send a random-generated token to the first-step authentication associated with user 'U1', in this case, the phone number of exemplary user 'U1'. The random-generated token may be, for example, a random six-digit series of numbers. In embodiments, user authentication program 150 may send the random-generated token along with a prompt that provides the user with explainability statements about the random-generated token and some brief instructions, such as where to input the random-generated token to proceed with authentication.

Next, at 208, user authentication program 150 may receive verification of the random-generated token. In embodiments, the verification of the random-generated token may be received by the exemplary chatbot frontend 310 associated with the chatbot and platform that received the request to resume the first chat conversation. In embodiments, user authentication program 150 may be configured to leverage chatbot frontend 310 to employ user interface 305 to provide the user with a prompt to input the random-generated token that was sent using their first-step authentication. Returning to the above example, at this step, user authentication program 150 may leverage exemplary chatbot frontend 310 to send a prompt via exemplary user interface 305 to exemplary user 'U1' requesting that user 'U1' input the random-generated token that was sent to their first-step authentication. Exemplary user 'U1' would then use a device associated with their phone number (first-step authentication) to access the random-generated token sent by user authentication program 150 and enter the received random-generated token into user interface 305 such that it is received by exemplary chatbot frontend 310 of exemplary chatbot 'C1'. In the context of this disclosure, verification of the random-generated token refers to any instance in which user authentication program 150 receives an accurate random-generated token from an exemplary user via an exemplary chatbot frontend 310. Once this occurs, the user has been verified, and user authentication program 150 will proceed with a second authentication step before resuming the conversation and outputting the previously stored chat history.

At 210, user authentication program 150 may generate, by a Large Language Model (LLM), one or more authentication questions based on content of the chat history. To accomplish this, user authentication program 150 may first leverage exemplary chatbot backend server 320 to retrieve the latest chat history from persistent storage 330 based on the user's first-step authentication (contact information). User authentication program 150 may then leverage a large language model 340, as shown in FIG. 3, to process the latest chat history and generate one or more authentication questions based on the context of the chat history. In embodiments, user authentication program 150 may further be configured to leverage large language model 340 to additionally provide a summarized chat history context to a second agent (human or chatbot) so that the second agent may quickly grasp the main problem or topic for which the user is seeking help. This would allow the second agent to provide more effective services immediately. In embodiments, to evaluate whether the generated authentication questions are valid and not too generic, user authentication program 150 may be configured to send the questions to a second language model (not shown) which does not have access to the chat history (and thus has no knowledge about the content), to let it answer the questions. If the second language model can answer correctly, the questions may be too 'easy' or generic and should be replaced or regenerated. Alternatively, the question may be deemed sufficiently unique to the user to be used for purposes of authenticating the user.

Next at 212, user authentication program 150 may authenticate the first user based on one or more correct answers to the one or more authentication questions. At this step, user authentication program 150 may utilize the chatbot frontend 310 to present the generated one or more authentication questions to the user using user interface 305. In embodiments, user authentication program 150 may, in response to receiving a sufficient number of correct answers for each of the one or more generated authentication questions, determine that the user's identity should be authenticated and verify the user. In embodiments, user authentication program 150 may be configured to authenticate or verify a user's identity for a predetermined number or percentage of correct answers as may be desired by the business or entity employing user authentication program 150. In embodiments, user authentication program 150 may be configured to disconnect or end the conversation or chat in response to the user failing to correctly answer one, multiple, or a specific percentage of the one or more generated authentication questions.

Thereafter at 214, user authentication program 150 may resume the first chat conversation with the authenticated first user, the resumed first chat conversation including the chat history. At this step, once the users identify has been authenticated, user authentication program 150 may send the stored chat history having a unique ID associated with the authenticated user's first-step authentication to the chatbot frontend 310 to be displayed using user interface 305. The user may then resume the first chat conversation with the chatbot with the added benefit of the chat history being included. Thus, the user will not have to start the conversation over or repeat any portion of the conversation and may instead continue the conversation as it was at or near the time of the disconnect.

It may be appreciated that user authentication program 150 has thus provided improved authentication of chatbot users for chat history recovery by providing for a method that may track users across multiple platforms by employing a two-step authentication process before allowing a user to resume a disconnected first conversation. Described embodiments utilize a first authentication mechanism associated with the user that is both secure, and functions as a method by which the user may receive a random-generated verification token. Described embodiments, upon receiving verification of the random-generated verification token, may then leverage large language models to generate a second authentication mechanism which includes authentication questions based upon content within stored chat history associated with the user. Upon authenticating the user based on correct answers to the generated authentication questions, described embodiments may then resume the first chat conversation with the previous chat history included and displayed to the user. Described embodiments thus provide for improved reliability and effectiveness of chatbots by employing multiple authentication mechanisms which ensure that valuable, private, or otherwise sensitive customer information is securely maintained even when resuming conversations including stored chat history across one or more platforms that may be used by multiple customers.

It may be appreciated that FIGS. 2-3 provide only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of authenticating chatbot users and recovering chat history associated with the chatbot users, the method comprising:

recording a first chat conversation between a first chat service operator and a first user, wherein the first chat conversation includes a first-step authentication and a chat history;

detecting a request to resume the first chat conversation, wherein the detected request to resume the first chat conversation is detected on a different platform from a first platform on which the chat service operator hosted the first conversation;

in response to detecting the request to resume the first chat conversation, initiating a recovery process by sending a random-generated token to the first-step authentication;

receiving verification of the random-generated token;

generating, by a large language model, one or more authentication questions based on content of the chat history;

authenticating the first user based on one or more correct answers to the one or more authentication questions; and resuming the first chat conversation with the authenticated first user, the resumed first chat conversation including the chat history.

2. The computer-based method of claim 1, wherein the first-step authentication comprises one of a phone number or an email.

3. The computer-based method of claim 1, wherein the first chat service operator comprises one or more web-based chatbots, one or more phone-based chatbots, or a combination thereof.

4. The computer-based method of claim 1, further comprising:
storing the chat history, using a chatbot backend server, within a storage component.

5. The computer-based method of claim 1, further comprising:
sending the one or more generated authentication questions to a second language model for answering; and
in response to detecting that the second language model correctly answered the one or more generated authentication questions, replacing the one or more generated authentication questions with a second set of generated authentication questions.

6. The computer-based method of claim 4, further comprising:
leveraging the chatbot backend server of the first chat service operator to generate a unique identifier associated with the first-step authentication corresponding to the first user; and
assigning the generated unique identifier to associated with the first-step authentication corresponding to the first user to the stored chat history.

7. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
recording a first chat conversation between a first chat service operator and a first user, wherein the first chat conversation includes a first-step authentication and a chat history; detecting a request to resume the first chat conversation, wherein the detected request to resume the first chat conversation is detected on a different platform from a first platform on which the chat service operator hosted the first conversation;

in response to detecting the request to resume the first chat conversation, initiating a recovery process by sending a random-generated token to the first-step authentication;

receiving verification of the random-generated token;

generating, by a large language model, one or more authentication questions based on content of the chat history;

authenticating the first user based on one or more correct answers to the one or more authentication questions; and resuming the first chat conversation with the authenticated first user, the resumed first chat conversation including the chat history.

8. The computer system of claim 7, wherein the first-step authentication comprises one of a phone number or an email.

9. The computer system of claim 7, wherein the first chat service operator comprises one or more web-based chatbots, one or more phone-based chatbots, or a combination thereof.

10. The computer system of claim 7, further comprising:
storing the chat history, using a chatbot backend server, within a storage component.

11. The computer system of claim 7, further comprising:
sending the one or more generated authentication questions to a second language model for answering; and
in response to detecting that the second language model correctly answered the one or more generated authentication questions, replacing the one or more generated authentication questions with a second set of generated authentication questions.

12. The computer system of claim 10, further comprising:
leveraging the chatbot backend server of the first chat service operator to generate a unique identifier associated with the first-step authentication corresponding to the first user; and
assigning the generated unique identifier to associated with the first-step authentication corresponding to the first user to the stored chat history.

13. A computer program product, the computer program product comprising:
one or more computer-readable tangible storage medium and program instructions stored on at least one of the one or more computer-readable tangible storage medium, the program instructions executable by a processor capable of performing a method, the method comprising:
recording a first chat conversation between a first chat service operator and a first user, wherein the first chat conversation includes a first-step authentication and a chat history; detecting a request to resume the first chat conversation, wherein the detected request to resume the first chat conversation is detected on a different platform from a first platform on which the chat service operator hosted the first conversation;

in response to detecting the request to resume the first chat conversation, initiating a recovery process by sending a random-generated token to the first-step authentication;

receiving verification of the random-generated token;

generating, by a large language model, one or more authentication questions based on content of the chat history;

authenticating the first user based on one or more correct answers to the one or more authentication questions; and resuming the first chat conversation with the authenticated first user, the resumed first chat conversation including the chat history.

14. The computer program product of claim 13, wherein the first-step authentication comprises one of a phone number or an email.

15. The computer program product of claim 13, wherein the first chat service operator comprises one or more web-based chatbots, one or more phone-based chatbots, or a combination thereof.

16. The computer program product of claim 13, further comprising:
   storing the chat history, using a chatbot backend server, within a storage component.

17. The computer program product of claim 13, further comprising:
   sending the one or more generated authentication questions to a second language model for answering; and
   in response to detecting that the second language model correctly answered the one or more generated authentication questions, replacing the one or more generated authentication questions with a second set of generated authentication questions.

* * * * *